United States Patent [19]

Moulding

[11] Patent Number: 5,069,046
[45] Date of Patent: Dec. 3, 1991

[54] ROLLER CYLINDER ASSEMBLY FOR PRESS FORMING GLASS SHEETS AND METHOD OF USING

[75] Inventor: Frank E. Moulding, Allen Park, Mich.

[73] Assignee: Ford Motor Company, Dearborn, Mich.

[21] Appl. No.: 581,346

[22] Filed: Sep. 11, 1990

[51] Int. Cl.$^5$ ............................................. C03B 23/03
[52] U.S. Cl. ..................... 65/106; 65/356; 65/374.12; 65/289; 29/898.061; 384/567
[58] Field of Search ................. 65/106, 245, 253, 256, 65/289, 374.12; 29/898.061; 384/567

[56] References Cited

U.S. PATENT DOCUMENTS

| | | |
|---|---|---|
| Re. 14,792 | 1/1920 | Buck . |
| 960,009 | 5/1910 | Goldman . |
| 1,136,089 | 4/1915 | Bernheim . |
| 1,362,910 | 12/1920 | Zoeller et al. . |
| 1,366,966 | 2/1921 | Spear . |
| 1,499,920 | 7/1924 | Godden . |
| 2,648,577 | 8/1953 | Watt . |
| 2,780,253 | 2/1957 | Joa . |
| 3,278,286 | 10/1966 | Nitsche et al. ............. 65/253 X |
| 3,360,174 | 12/1967 | Evert . |
| 3,741,743 | 6/1973 | Seymour ............... 65/374.12 X |
| 3,976,462 | 8/1976 | Sutara ..................... 65/374.12 |
| 4,225,097 | 9/1980 | Ohtomo ................... 249/55.01 |
| 4,403,720 | 9/1983 | Grant ............................ 226/190 |
| 4,723,983 | 2/1988 | Erdmann et al. ........... 65/289 X |
| 4,729,500 | 3/1988 | Gwon ........................... 226/190 |
| 4,775,404 | 10/1988 | Klempner et al. ........... 65/106 X |

Primary Examiner—Robert L. Lindsay
Attorney, Agent, or Firm—Charles H. Ellerbrock; Roger L. May

[57] ABSTRACT

A ball bearing type roller cylinder assembly is disclosed comprising a center shaft having a free end. The shaft may, for example, be held in a mounting fixture. A spindle concentric with the center shaft is fixed on its free end. A roller cylinder housing the spindle comprises a cylindrical outer skirt, a first end cap which cooperates with a first end surface of the spindle to form a first ball bearing race, and a second end cap which cooperates with the second end of the spindle to form a second ball bearing race. The roller cylinder is freely rotatable and contacts the spindle only indirectly through the ball bearings. Preferred emobodiments of the roller cylinder assembly are suitable for use alone or in sets in high temperature applications, particularly in glass fabrication systems for hot press forming heated sheets of glass.

6 Claims, 3 Drawing Sheets

ROLLER CYLINDER ASSEMBLY FOR PRESS FORMING GLASS SHEETS AND METHOD OF USING

FIELD OF THE INVENTION

This invention relates generally to a roller cylinder assembly. More particularly, the invention relates to a roller cylinder assembly wherein an exterior working surface of a roller cylinder is carried on the free end of a mounting shaft. Certain preferred embodiments are suitable for use in high temperature environments. Another aspect of the invention relates to a glass fabrication system employing one or more such roller cylinder assemblies.

BACKGROUND OF THE INVENTION

In the art of glass fabrication involving the bending of a glass sheet into a particular desired configuration or curvature, it has long been known to use a hot press forming process. Such process can be used, for example, in the manufacture of curved motor vehicle windows. In a hot press forming process a glass sheet is heated in a lehr, typically as the glass passes over horizontally mounted ceramic rollers. In certain advanced versions of the process the glass is picked up by a so-called air suspension block ("ASB") at the end of the line of ceramic rollers. By a careful balance of vacuum and blown air, the ASB suspends the glass in a horizontal plane a few millimeters below the ASB surface. The glass at this point is still travelling through the lehr. At the end of the ASB suspension of the glass is terminated such that it drops onto a hot press forming tool. The hot press forming tool typically provides a support surface adapted to contact only the peripheral portion of the lower surface of the glass. To stop the forward motion of the glass and properly position it over the hot press forming tool, it is known to provide "nesters," a set of rotatable metal plates forming a "nest" in a horizontal plane above a hot press forming tool.

Each of the rotatable metal plates which form the glass-positioning nest at the end of the ASB above the hot press forming tool sits atop a metal post. Typically, such metal posts are mounted to mounting brackets fixed at spaced peripheral locations about the glass support surface of the hot press forming tool. The leading edges of the advancing glass sheet contact the outer peripheral surface of the metal plates. In fabricating a motor vehicle window, for example, three rotatable plates can be used to stop and position the glass sheet. As the window advances into the nest formed by the rotatable plates, it is guided by the rotatable plates into proper lateral position and is stopped in proper longitudinal position. With the glass sheet now properly positioned at the end of the ASB, the ASB vacuum is shut off and the hot glass sheet drops onto the hot press forming tool.

Primarily because of the extremely high operating temperatures within a lehr, the rotatable metal plates frequently do not rotate sufficiently freely on the metal posts on which they sit. High temperatures cause the metal plates to bind with the metal posts. When the advancing glass sheet contacts a metal plate which is not freely rotatable, it tends to pivot about the contact point, rather than being nudged laterally into proper location. If the hot glass sheet is not properly positioned by the rotatable metal plates, it will not drop into proper position on the press forming tool and will not be properly formed during the press forming process. A particularly difficult problem in this regard has been the occurrence of "galling" of metal parts which move over one another at such elevated temperatures. Galling includes pitting and flaking of the metal surface and typically causes binding of otherwise freely movable parts. This results in reduced productivity, reduced output and increased manufacturing costs.

It is an object of the present invention to provide a roller cylinder assembly of new and improved design. It is an object of certain preferred embodiments of the invention to provide a roller cylinder assembly suitable for use in a high temperature environment, such as a glass fabrication lehr, specifically, a roller cylinder assembly which remains freely rotatable at such elevated temperatures. It is another object of certain particularly preferred embodiments of the invention to provide a glass fabrication system employing multiple such roller cylinder assemblies which cooperate with each other to properly position a hot glass sheet in a horizontal plane of travel above a hot press forming tool. These and other objects and advantages of the invention will be better understood from the disclosure and discussion of the invention set forth below.

SUMMARY OF THE INVENTION

According to a first aspect of the invention, a ball bearing roller cylinder assembly comprises a center shaft having a free end. The opposite end of the shaft may, for example, be fixed in a mounting bracket or the like. A spindle concentric with the center shaft is fixed on its free end. The spindle is housed within a freely rotatable roller cylinder comprising a cylindrical outer skirt. The exterior surface of the cylindrical outer skirt forms the working surface of the assembly, that is, the surface adapted to contact a work piece. The roller cylinder further comprises a first end cap fitted at one of the open ends of the cylindrical outer skirt. It cooperates with a first end surface of the spindle to form a ball bearing race. A second end cap at the other end cooperates with the opposite end surface of the spindle to form a second ball bearing race. Ball bearings are disposed in the ball bearing races which lie in planes substantially parallel to each other and perpendicular to the longitudinal axis of the spindle and center shaft. The roller cylinder, therefore, forms essentially a canister enclosing the spindle, but contacts the spindle only indirectly through the two sets of ball bearings. The roller cylinder is, accordingly, freely rotatable about the spindle and center shaft.

According to a further aspect of the invention, a glass fabrication system is provided which employs a number of roller cylinder assemblies arranged to form a nest in the horizontal plane of travel of a hot glass sheet. The roller cylinder assemblies are preferred embodiments of the ball bearing assemblies described immediately above. Specifically, they are suitable for use in high temperature environments, having features described in more detail below. The nest is adapted to receive and properly position the hot glass sheet for further processing, such as hot press bending.

In operation, the exterior surface of the cylindrical outer skirt is freely rotatable. In the context of a hot press forming operation for glass fabrication, the roller cylinder assembly can replace the rotable metal plates presently in use in such systems. Specifically, advancing glass is guided into proper position above a hot press forming tool by contact with the roller cylinder. The free rotatability of the roller cylinder decreases the tendency of the advancing glass sheet to pivot in its plane of travel about the contact point with the roller cylinder assembly. Accordingly, glass sheets are more reliably and consistently located in proper position on the hot press forming tool for subsequent press bending operations. As a result, productivity of the fabrication process is improved, output is increased and costs are reduced.

Additional features and advantages of the invention will be apparent from the following detailed description of certain preferred embodiments of the invention, taken together with the accompanying drawings.

BRIEF DESCRIPTION OF THE DRAWINGS

Certain preferred embodiments of the invention are illustrated in the accompanying drawings, in which like reference numerals designate like or functionally equivalent parts.

DETAILED DESCRIPTION OF PREFERRED EMBODIMENTS

Figure 1:
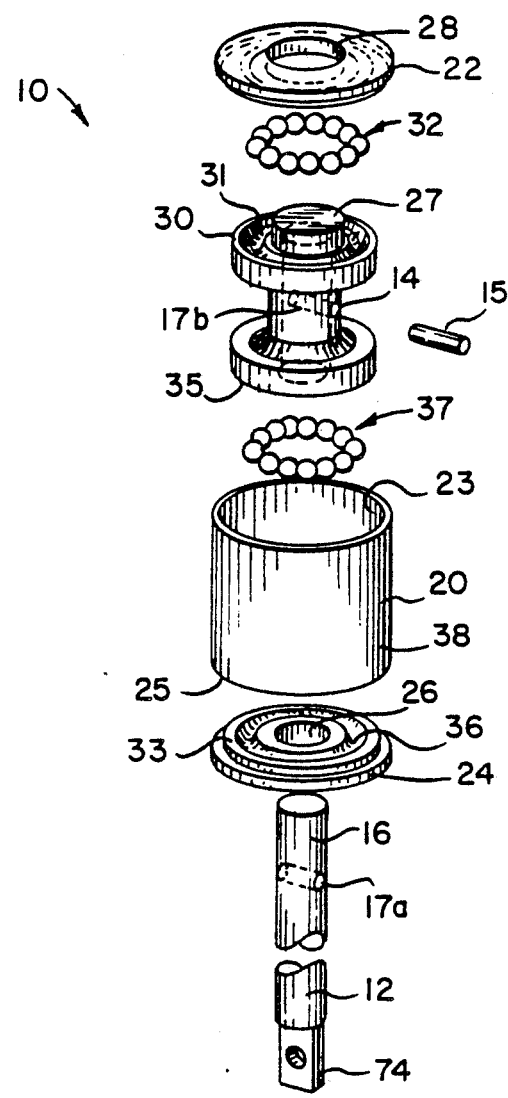
FIG. 1 is an exploded perspective view of a preferred embodiment of the ball bearing roller cylinder assembly of the invention, shown together with a mounting bracket suitable for mounting the assembly to a hot press forming tool used in a hot press forming process for glass fabrication.
Figure 1:
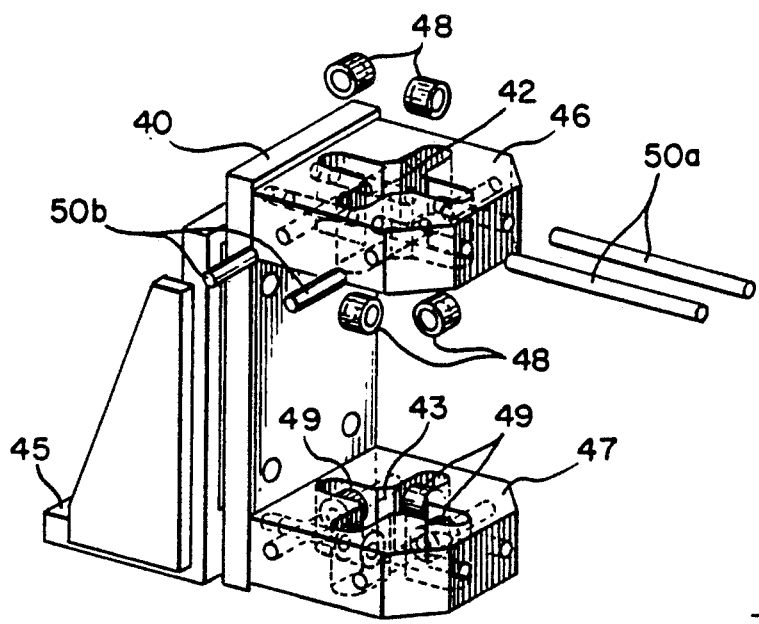
Figure 3:
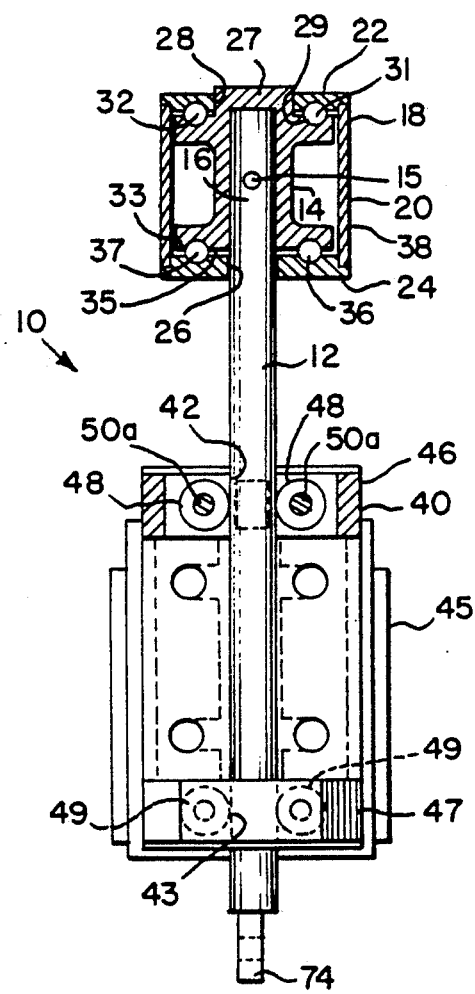
FIG. 3 is a front elevation of the roller cylinder assembly FIGS. 1 and 2, shown partially in cross section along line 3—3 in FIG. 2.
Figure 2:
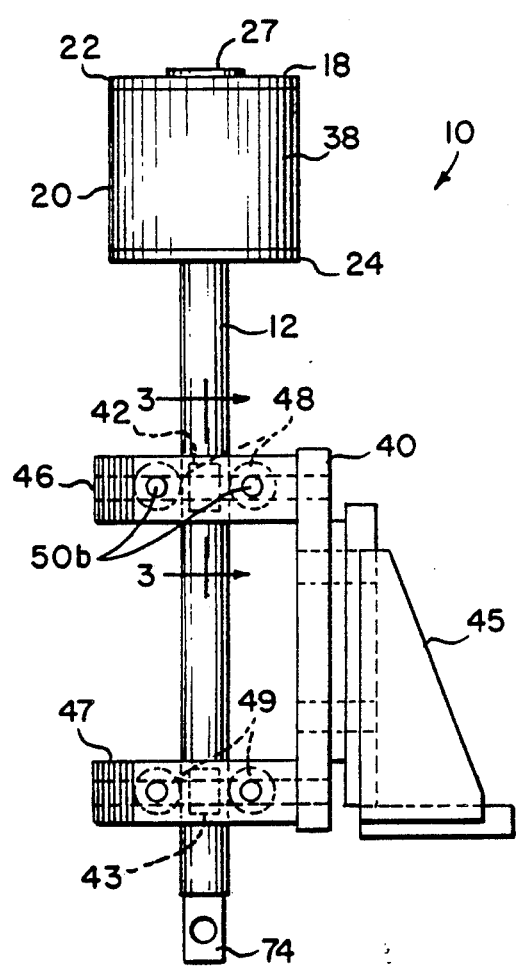
FIG. 2 is a side elevation of the roller cylinder assembly of FIG. 1, together with the mounting bracket, shown in assembly.

Referring now to FIGS. 1 through 3, a ball bearing roller cylinder assembly 10 is seen to comprise a center shaft 12 which in the preferred embodiment illustrated is round in cross section. A spindle 14 is mounted on free end 16 of the center shaft 12. In assembly, the spindle 14 is housed within roller cylinder 18. Roller cylinder 18 comprises a cylindrical outer skirt 20 which is concentric with the spindle 14 and center shaft 12. The roller cylinder 18 further comprises upper end cap 22 fitted into the upper open end 23 of the cylindrical outer skirt 20. Correspondingly, lower end cap 24 is fitted into lower open end 25 of the cylindrical outer skirt 20. The lower end cap 24 has a center hole 26 through which the center shaft passes upwardly into the spindle 14 within the roller cylinder 18. For reasons discussed further below, spindle 14 has upwardly projecting button 27 which extends upwardly through center hole 28 in upper end cap 22. Specifically, button 27 of spindle 14 extends beyond the plane of upper end cap 22.

The inside surface 29 of upper end cap 22 cooperates with upper end surface 30 of spindle 14 to form an upper ball bearing race 31 in which is disposed ball bearing set 32. Similarly, inside surface 33 of lower end cap 24 cooperates with lower end surface 35 of spindle 14 to form a lower ball bearing race 36 in which is disposed lower ball bearing set 37. As best seen in FIG. 3, the roller cylinder 18 is freely rotatable about spindle 14 and center shaft 12. It contacts spindle 14 only indirectly via the upper and lower ball bearing interfaces. When manufactured with suitably close tolerances, a ball bearing roller assembly according to the invention is found to provide excellent freedom of rotation for the working surface, the exterior cylindrical surface 38 of cylindrical skirt 20, while at the same time providing excellent resistance to wobble and the like.

Spindle 14 can be mounted onto the free end 16 of center shaft 12 by means of spindle pin 15. Pin hole 17a in free end 16 of center shaft 12 is aligned with pin hole 17b in the center portion of spindle 14 and spindle pin 15 forms a friction fit within the aligned holes.

The ball bearing roller cylinder assembly of the invention illustrated in FIGS. 1 through 3 further comprises mounting means 40 for mounting the assembly to a support structure. The center shaft 12 is vertically (that is, axially) movable in the mounting means in guide holes 42 and 43 defined in part by rollers which are rotatable mounted in the mounting means in contact with the center shaft 12. The rollers are discussed further below.

The mounting means of the preferred embodiment of the invention illustrated in the drawings comprises a bracket portion 45 which is adapted to be fixed to a support structure. A pair of spaced guide plates 46 and 47 extend substantially rigidly from the bracket portion 45 in spaced, parallel planes substantially perpendicular to the longitudinal axis of the center shaft 12. Each of the guide plates has one of the aforesaid guide holes which, in the embodiment illustrated, are defined in part by a set of four of the aforesaid rollers mounted at circumferentially spaced location. More specifically, guide hole 42 seemed to be defined in part by four rollers 48. Similarly, guide hole 43 is defined in part by four rollers 49 mounted in lower guide plate 47. Each of the rollers is mounted on a corresponding roller pin. Thus, rollers 48 defining upper guide hole 42 are mounted on roller pins 50a and 50b. Corresponding roller pins (not shown) are provided for the rollers defining lower guide hole 43. It can be seen that roller pins 50b are shorted than pins 50a, such that they can be centered in the guide plate 46 to allow passage of roller pins 50a front-to-back in the guide plate. The rollers are rotatable about the roller pins in response to axial movement of the center shaft. The assembly can be manufactured with sufficiently close tolerances, however, that lateral (side to side and front to back) movement of the center shaft is prevented.

According to certain preferred embodiments of the invention, the ball bearing roller cylinder assembly consists entirely of materials operatively functional at elevated temperatures, most preferably at temperatures as high as about 1100° F. To be operatively functional at such elevated temperatures the working surface 38 of the assembly must remain freely rotatable. Moreover, the assembly must be sufficiently durable to maintain this condition for a sufficiently extended period of use. In the context of glass fabrication, such as motor vehicle window fabrication by a hot press bending process, the roller cylinder assembly must remain operatively functional during repeated extended production runs at temperature as high as 1100° F. with intermittent cooling. Preferred embodiments of the present invention provide excellent resistance to galling and remain operatively functional at elevated temperatures in glass fabrication processes. For such applications the ball bearings of the assembly preferably are a first stainless steel having tensile strength of at least about 40,000 psi at 1100° F. and the spindle and end caps are a second stainless steel dissimilar to the first stainless steel and having tensile strength of at least about 10,000 psi at 1100° F. The use of such dissimilar metals is believed to provide the invention's excellent resistance to galling at elevated temperatures. Preferably the ball bearings are an alloy selected from the group consisting of Hastalloy C and A-286 alloys, and the spindle and the end caps are an alloy different from the ball bearings and selected from the group consisting of Hastalloy C, A-286 stainless steel, 304 stainless steel and 316 stainless steel. Most preferably the ball bearings are Hastalloy C and the spindle and end caps are 304 stainless steel. The roller cylinder also most preferably is 304 stainless steel. In embodiments having mounting means, the bracket, guide plates and roller pins also most preferably are 304 stainless steel and the rollers are A-286 stainless steel. Here, again, contacting metal parts which move over one another are formed of suitable, dissimilar alloys. All of the aforesaid alloys are commercially available and well known to those skilled in the art. Thus, for example, Hastalloy C-276 is commercially available from Cabot Corporation having a composition of approximately 16.36% chromium, 15.66% molybdenum, 5.83% iron, 3.61% tungsten, 1.59% cobalt, 0.51% manganese, 0.15% vanadium, 0.02% silicon, less than 0.002% carbon, 0.004% sulfur, 0.006% phosphorous and the balance nickel. Suitable alternative alloys will be apparent in view of the present disclosure.

It will be within the ability of those skilled in the art to select suitable dimensions for all components of the roller cylinder assembly of the invention for glass fabrication processes and other applications. In an exemplary unit for use in a hot press forming process for motor vehicle window fabrication the upwardly extending button 27 of spindle 14 would typically extend approximately three to five thousandths above the upper end plate 22 and the assembly would have a three inch diameter working surface 38. It would be consistent with such exemplary dimensions to employ ⅜ inch diameter ball bearings in the upper and lower ball bearing races 31, 36 and a center shaft fashioned of 0.75 inch diameter 304 stainless steel.

As indicated above, the ball bearing roller cylinder assembly of the invention is particularly advantageous for use in a high temperature environment such as glass fabrication. In particular, a set of roller cylinder assemblies adapted for high temperature environments, as discussed above, can be incorporated into a hot press forming tool for glass fabrication. It should be understood that the following discussion of this additional aspect of the invention is a preferred and particularly advantageous application of the above described ball bearing roller cylinder assembly. It is not, however, the only application nor even the only advantageous high temperature application for which the ball bearing roller cylinder assembly is suitable.

Figure 4:
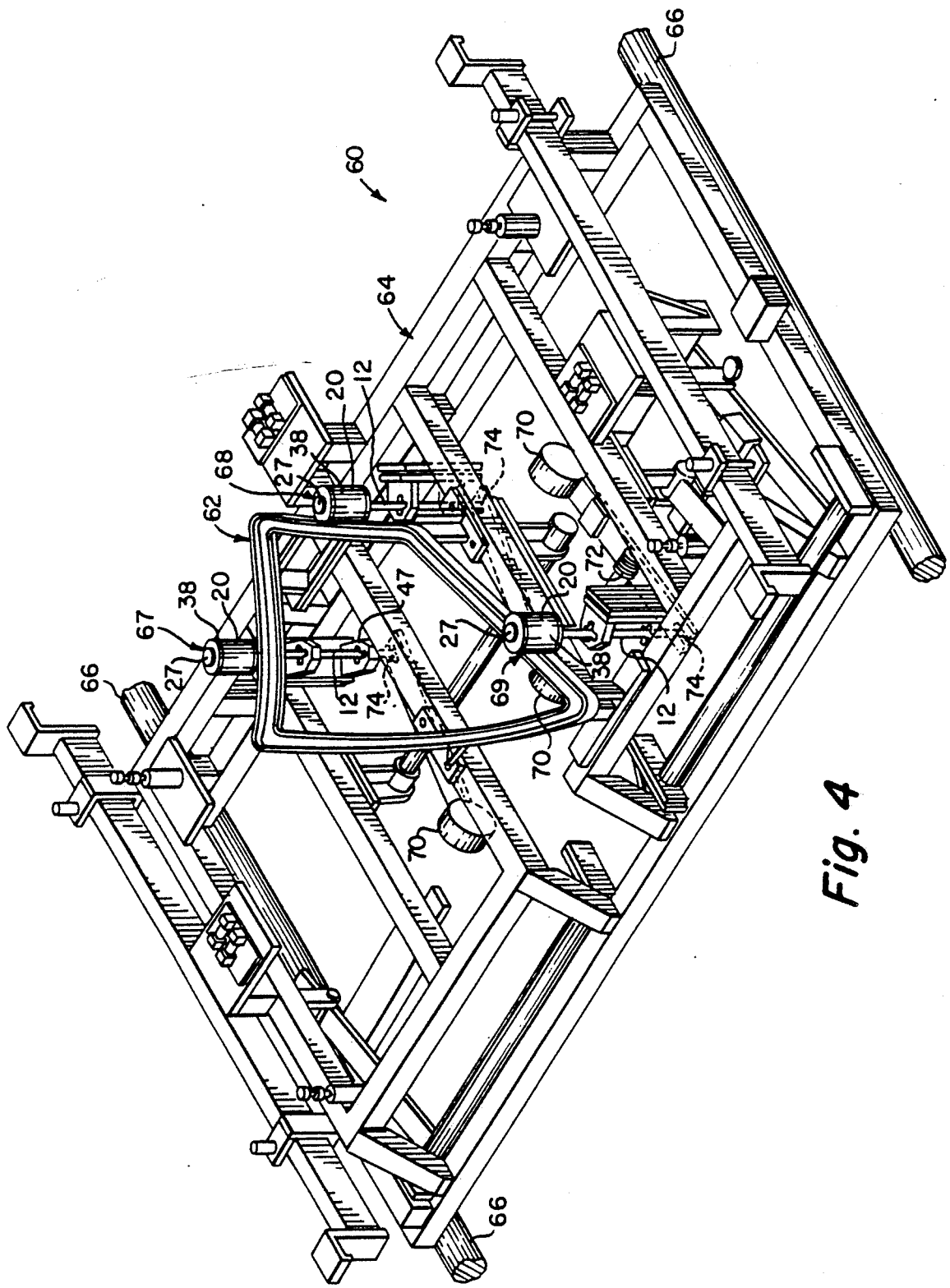
FIG. 4 is a diagrammatic perspective view, partially in cross section, of a hot press forming tool for glass fabrication. Three ball bearing roller cylinder assemblies corresponding to that shown in FIGS. 1-3 are incorporated into the tool.

Referring now also to FIG. 4, a hot press forming tool 60 is seen to comprise support means for supporting a glass sheet in a substantially horizontal plane. Specifically, support surface 62 is adapted to support a generally trapezoidally shaped glass sheet to be bent by press forming to form a rear quarter window for a motor vehicle. It can be seen that support surface 62 would contact the underside of the glass sheet only at the periphery thereof. The support surface 62 is, in turn, supported by frame 64. FIG. 4 illustrates diagrammatically a simplified frame 64. It is within the ability of those skilled in the art to design this and all other routine elements of the hot press forming tool. The frame 64 rests on shuttle tubes 66 for travelling to and fro between a first location under an air suspension block, where the tool receives a hot glass sheet as discussed generally above, to a second location in which the hot glass sheet is press formed. The hot press forming tool 60 is seen in FIG. 4 to further comprise a plurality of ball bearing roller cylinder assemblies of the invention. Specifically, three assemblies 67, 68 and 69 are mounted to the frame at spaced locations about the perimeter of the glass support surface 62. Each extends substantially vertically upwardly from the frame above the horizontal plane of the support surface 62. More specifically, the working surface, that is exterior surface 38 of the cylindrical outer skirt of each assembly cooperates with the other two to form together a "nest" in the horizontal plane of travel of a hot glass sheet suspended beneath the air suspension block. In use the upwardly extending spindle button 27 would press gently upwardly against the bottom of an air suspension block when the tool was in position to receive a glass sheet. This would leave the roller cylinders 20 freely rotatable, since they would not contact the air suspension block. The roller cylinders would guide the glass sheet laterally and stop the glass sheet in proper position above the glass support surface 62. Suspension of the glass sheets by the air suspension block would then be terminated and the glass would drop in proper position onto the support surface 62 of the forming tool.

To provide the aforesaid upward bias of the roller cylinder assemblies against the underside of an air suspension block, each of the roller cylinder assemblies of forming tool 60 is provided with biasing means. More specifically, in the preferred embodiment illustrated each of the roller cylinder assemblies is provided with a counterweight 70 linked through pivot means 72 (not visible for all roller assemblies in FIG. 4) to the lower end 74 of the center shaft 12 of the roller cylinder assemblies. As best seen in FIGS. 1 through 3, lower end 74 of center shaft 12 is adapted for connection to suitable linkage means. Specifically, in the embodiment illustrated a bolt hole and flats are provided for connection to the linkage means.

It will be recognized by those skilled in the art that the ball bearing roller cylinder assemblies 67, 68 and 69 in the hot press forming tool 60 replace metal plate "nesters" previously known for use in such applications. As discussed above, metal plate "nesters" perform poorly due, in part, to their tendency to gall and bind rather than rotating freely. The ball bearing roller assemblies of the present invention, in contrast, are found to perform well, specifically, remaining operatively functional even after prolonged use at the elevated temperatures experienced by a hot press forming tool in a glass fabrication process.

The foregoing extensive disclosure and description of the several aspects of the present invention will suggest and render apparent to those skilled in the art various modifications and variations within the spirit and scope of the subject invention as defined in the following claims.

I claim:

1. A hot press forming tool for glass fabrication comprising:
   support means for supporting a glass sheet in a substantially horizontal plane;
   frame means for supporting said support means; and a plurality of ball bearing roller cylinder assemblies mounted to the frame means at spaced locations about the perimeter of said support means and extending substantially vertically upwardly therefrom above said horizontal plane, each of the assemblies comprising:

an elongate center shaft having a substantially vertical longitudinal axis, an upper end and a lower end;

a spindle fixed on the upper end of the center shaft, having upper and lower oppositely facing end surfaces, each in a plane substantially perpendicular to the longitudinal axis of the center shaft;

a freely rotatable roller cylinder housing the spindle and comprising (i) a cylindrical outer skirt concentric with the center shaft, (ii) an upper end cap cooperating with the upper end surface of the spindle to form an upper ball bearing race, and (iii) a lower end cap cooperating with the lower end surface of the spindle to form a lower ball bearing race;

an upper ball bearing set in the upper ball bearing race and a lower ball bearing set in the lower ball bearing race; and mounting means for mounting the ball bearing roller cylinder to the support means, the center shaft being axially moveable and laterally fixed in the mounting means in guide holes defined, at least in part, by rollers rotatably mounted in contact with the center shaft.

2. The hot press forming tool of claim 1 wherein said ball bearing roller cylinder assembly further comprises biasing means for upwardly biasing said center shaft.

3. The hot press forming tool of claim 2 wherein the biasing means comprises a counterweight linked through a pivot means for applying leverage to the lower end of the center shaft.

4. A hot press forming tool for glass fabrication comprising:

support means for supporting a glass sheet in a substantially horizontal plane; and a plurality of ball bearing roller cylinder assemblies mounted to the support means at spaced perimeter locations and extending substantially vertically upwardly therefrom, each of the assemblies comprising:

an elongate 304 stainless steel center shaft having a substantially vertical longitudinal axis, an upper end and a lower end;

a 304 stainless steel spindle fixed on the upper end of the center shaft, having upper and lower oppositely facing end surfaces, each in a plane substantially perpendicular to the longitudinal axis of the center shaft;

a 304 stainless steel roller cylinder which is freely rotatable at 1100° F. and which houses the spindle; the roller cylinder comprising (i) a cylindrical outer skirt concentric with the center shaft, (ii) an upper end cap cooperating with the upper end surface of the spindle to form an upper ball bearing race, and (iii) a lower end cap cooperating with the lower end surface of the spindle to form a lower ball bearing race;

a first set of Hastalloy C ball bearings in the upper ball bearing race and a second set of Hastalloy C ball bearings in the lower ball bearing race;

mounting means for mounting the ball bearing roller cylinder assembly to the support means, the mounting means comprising a bracket fixable to the support means and a pair of spaced, parallel guide plates extending substantially rigidly from the bracket, the center shaft being axially moveable and laterally fixed in the mounting means, extending axially through a guide hole in each guide plate, the guide holes each being defined, in part, by a set of four circumferentially spaced A-286 stainless steel rollers mounted in contact with the center shaft on 304 stainless steel pins, each forming a friction fit in a corresponding roller pin hole in the guide plate and each being rotatable about its roller pin at 1100° F. in response to axial movement of the center shaft; and biasing means for upwardly biasing the center shaft comprising a counterweight linked through a pivot means to the lower end of the center shaft.

5. A glass fabrication process for treating a heated glass sheet comprising:

heating the glass sheet as it travels through a lehr; and guiding the glass sheet, at least in part, by contact with a ball bearing roller cylinder assembly comprising:

an elongate center shaft;

a spindle concentric with, and fixed on the free end of, the center shaft, having oppositely facing first and second end surfaces, each in a plane substantially perpendicular to the longitudinal axis of the center shaft;

a freely rotatable roller cylinder housing the spindle and comprising a cylindrical outer skirt concentric with the center shaft, a first end cap cooperating with the first end surface of the spindle to form a first ball bearing race, and a second end cap cooperating with the second end surface of the spindle to form a second ball bearing race; and a first set of ball bearings disposed between the first end cap and the spindle in the first ball bearing race and a second set of ball bearings disposed between the second end cap and the second end surface of the spindle in the second ball bearing race.

6. A hot press forming process for shaping a heated glass sheet comprising:

heating the glass sheet as it travels through a lehr in a horizontal plane supported by balanced air pressure and vacuum provided by an air suspension block; and stopping the glass sheet in proper position over a hot press forming tool by contact with a set of ball bearing roller cylinder assemblies arranged to from a concentric nest in the horizontal plane of travel of the glass sheet, each ball bearing roller cylinder assembly comprising:

an elongate 304 stainless steel center shaft having a substantially vertical longitudinal axis, an upper end and a lower end;

a 304 stainless steel spindle fixed on the upper end of the center shaft, having upper and lower oppositely facing end surfaces, each in a plane substantially perpendicular to the longitudinal axis of the center shaft;

a 304 stainless steel roller cylinder which is freely rotatable at 1100° F. and which houses the spindle; the roller cylinder comprising (i) a cylindrical outer skirt concentric with the center shaft, (ii) an upper end cap cooperating with the upper end surface of the spindle to form an upper ball bearing race, and (iii) a lower end cap cooperating with the lower end surface of the spindle to form a lower ball bearing race;

a first set of Hastalloy C ball bearings in the upper ball bearing race and a second set of Hastalloy C ball bearings in the lower ball bearing race;

mounting means for mounting the ball bearing roller cylinder assembly to the support means, the mounting means comprising a bracket fixable to the support means and a pair of spaced, parallel guide plates extending substantially rigidly from the bracket, the center shaft being axially moveable and laterally fixed in the mounting means, extending axially through a guide hole in each guide plate, the guide holes each being defined, in part, by a set of four circumferentially spaced A-286 stainless steel rollers mounted in contact with the center shaft on 304 stainless steel pins, each forming a friction fit in a corresponding roller pin hole in the guide plate and each being rotatable about its roller pin at 1100° F. in response to axial movement of the center shaft; and biasing means for upwardly biasing the center shaft comprising a counterweight linked through a pivot means to the lower end of the center shaft.

* * * * *